United States Patent [19]
Frye

[11] 3,881,133
[45] Apr. 29, 1975

[54] TWO DOT INDICATOR SYSTEM

[75] Inventor: George Joseph Frye, Beaverton, Oreg.

[73] Assignee: Tektronix, Inc., Beaverton, Oreg.

[22] Filed: June 18, 1973

[21] Appl. No.: 371,220

[52] U.S. Cl. ................................................. 315/395
[51] Int. Cl. ............................................. H01j 29/72
[58] Field of Search ......... 315/18, 19, 22, 24, 27 R, 315/27 TD, 28, 29; 178/7.5 R

[56] References Cited
UNITED STATES PATENTS
3,706,904   12/1972   Mordan............................. 315/27 R Primary Examiner—Malcolm F. Hubler
Assistant Examiner—J. M. Poten
Attorney, Agent, or Firm—Adrian J. LaRue

[57] ABSTRACT

An improved two-dot indicator system has been developed for use with cathode-ray tube displays. A first intensified dot can be adjusted to any location desired for a reference, then a second intensified dot can be moved to a second location of interest by turning a potentiometer. The potentiometer includes a dial which is calibrated to a graticule scale, enabling precise measurement of the axial distance between the two intensified dots to be read directly from the dial. Circuitry is incorporated to maintain the calibrated distance between dots, permitting the first dot to move when the second dot reaches the screen edge.

11 Claims, 3 Drawing Figures

TWO DOT INDICATOR SYSTEM

BACKGROUND OF THE INVENTION

In dual-sweep oscilloscopes having a delayed sweep mode, one popular method of locating the position of a delayed sweep upon the display of a delaying sweep is to intensify the segment of the display represented by the delayed sweep. The intensified segment can be moved the entire length of the sweep trace by use of a calibrated control called a "delay multiplier." The control provides an accurate reading of the distance, or time delay, from the start of the sweep to the start of the delayed sweep represented by the intensified segment.

In equivalent-time sweep systems, such as those used in sampling oscilloscopes, the brightened segment method of delayed sweep location is difficult to implement. Therefore, in sampling oscilloscopes a practical solution has been to display a brightened dot at the point on the display where the delayed sweep starts. A refinement to this single-dot indicator was the addition of an uncalibrated offset control which could be adjusted to locate the dot at a desired point on a waveform display with the calibrated delay multiplier control set to zero. Then the delay multiplier control could be adjusted to move the dot to a second point of interest, providing an accurate reading of the distance between the two points of interest.

The most desirable range for the offset control is one screen width. Unfortunately, when the offset control is used, the calibration of the delay multiplier control is upset when a setting is chosen that drives the intensified dot offscreen. The optimum system would include two dots, one to be located at a first point of interest using a zero offset control, and the other to be located using the calibrated delay multiplier control to thereby provided an accurate measurement of the distance between the two dots.

Such a two-dot indicator system has now been developed to facilitate time measurements between two points of interest on a waveform display. Special circuitry is incorporated to eliminate the overranging problem incurred when the second dot reaches the screen edge as the calibrated control is turned. At this point, the second dot stops and remains stationary as the first dot moves toward the opposite screen edge as the calibrated control is turned, maintaining the calibrated reading between the two dots.

It is therefore one object of the present invention to provide an improved indicator system for locating two points of interest on a waveform display and providing accurate measurement therebetween.

It is another object of the present invention to provide an improved indicator system using two intensified dots on a waveform display wherein said dots are limited to on-screen positions.

It is a further object of the present invention to provide an indicator system using two intensified dots on a waveform display in which the distance between such dots is calibrated at all times.

Further objects, features, and advantages will be apparent from consideration of the following description taken in conjunction with the accompanying drawings.

DRAWINGS

DETAILED DESCRIPTION

Figure 1:
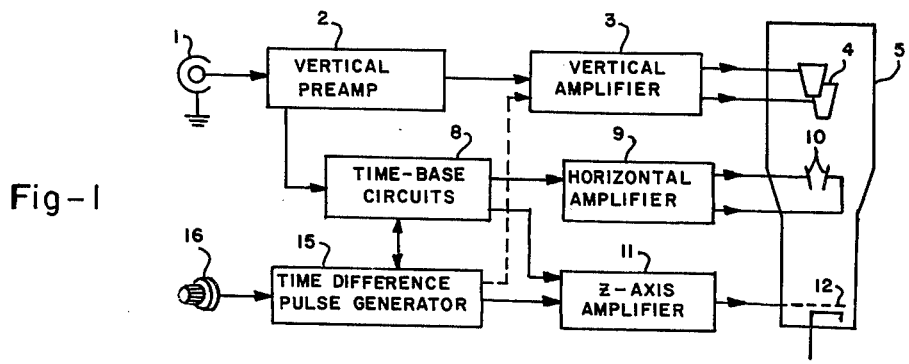
FIG. 1 shows a block diagram of a typical oscilloscope incorporating a two-dot generating system according to the present invention.

FIG. 1 shows a block diagram of a typical oscilloscope incorporating the present invention. Input terminal 1 permits application of signals to the vertical preamplifier 2. The preamplified signals are then passed to vertical amplifier 3 before being applied in push-pull relationship to deflection plates 4 of cathode ray tube 5. A sample of the signal is applied from vertical preamplifier 2 to the time-base circuits 8 as a triggering signal. The time-base circuits 8, which may include both a normal and delayed sweep generator, produces a linear ramp voltage, or sawtooth, to drive the cathode-ray tube beam across the screen at a uniform rate. Horizontal amplifier 9 receives the sawtooth signal and converts it to a push-pull signal suitable to drive deflection plates 10. The time-base circuits 8 also produce pulse signals corresponding to the sweep ramp. These pulses are applied via z-axis amplifier 11 to the control grid 12 to turn the tube on during a sweep and off during the retrace portion of the sawtooth signal. The time difference pulse generator 15 receives the sweep sawtooth ramp voltage from time-base circuits 8 and generates two differentiated pulses at predetermined levels of the ramp voltage. An internal linear potentiometer, driven by dial-knob 16, permits an accurate time difference between the differentiated pulses to be set, such time difference then being readable on the dial knob 16. The differentiated pulses produced by generator 15 are then applied to the z-axis amplifier to produce intensified dots, or alternatively, the differentiated pulses can be applied to the vertical amplifier 3 to appear as markers in the display.

Figure 2:
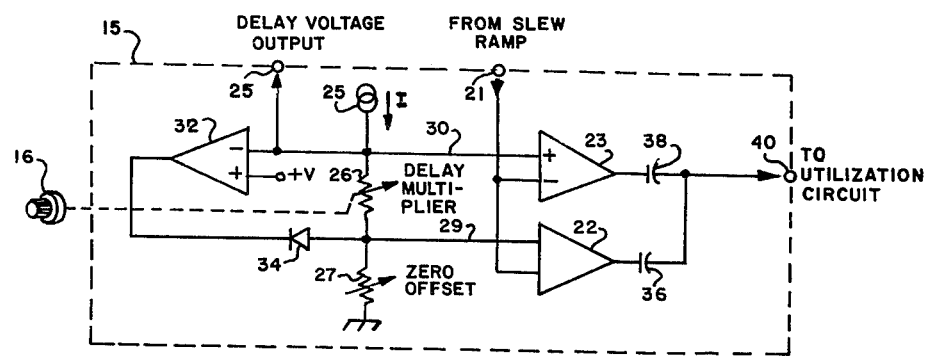
FIG. 2 shows a detailed block diagram of the pulse-generating portion of the preferred embodiment of the present invention.

FIG. 2 shows a detailed block diagram of the time-difference pulse generator 15 according to the present invention. An input terminal 21 is connected to the negative inputs of a pair of voltage comparators 22 and 23. A constant currect source 25 is connected to ground through a serially-connected pair of potentiometers 26 and 27. The junction between potentiometers 26 and 27 is connected via line 29 to the positive input of comparator 22 and the junction between current source 25 and potentiometer 26 is connected via line 30 to the positive input of comparator 23. A loop comprising a third comparator 32 and a diode 34 is connected between lines 30 and 29. A reference voltage +V is applied to the positive input of comparator 32 as a reference, while the voltage level on line 30 is applied to the negative input thereof. Capacitors 36 and 38 are connected to the outputs of comparators 22 and 23 respectively, and to a common output terminal 40. Terminal 42 is connected to line 30 to provide a voltage output, for example, to provide the comparison level for initiating a delayed sweep.

Figure 3:
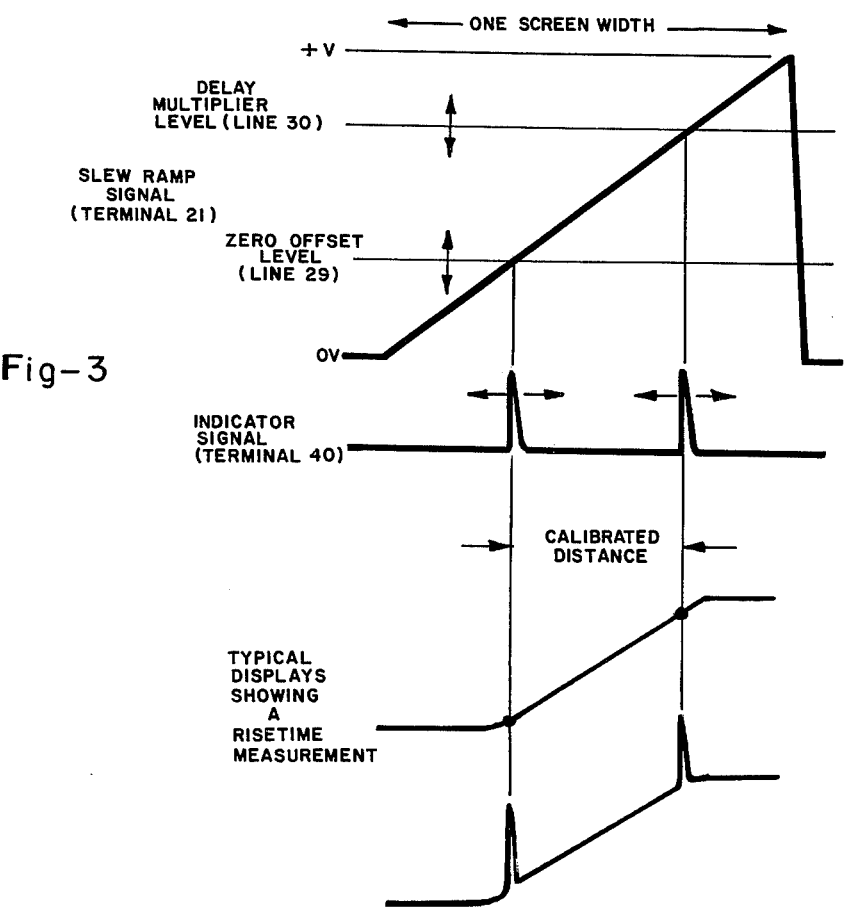
FIG. 3 illustrates a waveform ladder diagram showing the relationship of important waveforms of the system and the timing therebetween.

A slew ramp signal comprising a sawtooth voltage is applied to the input terminal 1 and applied simultaneously to the negative inputs of comparators 22 and 23. For this discussion, the slew ramp signal is the sweep-driving sawtooth voltage of an oscilloscope, whose amplitude is from zero volts to some positive voltage +V, as shown in FIG. 3. Accordingly, the time duration for the sawtooth to increase from zero volts to +V is calibrated to provide one screen width of cathode-ray tube beam deflection.

Current source 25 provides a constant current through potentiometers 26 and 27 to establish voltage levels determined by the respective IR drops on lines 29 and 30, such voltage levels being applied to the positive inputs of comparators 22 and 23 to provide the reference levels at which the comparator outputs switch. As will be discussed later, these levels can be adjusted to any voltage between 0 and +V. When the linearly rising sawtooth voltage at input terminal 21 reaches the reference voltage levels on lines 29 and 30, the respective outputs from comparators 22 and 23 switch from a low state to a high state, producing positive-going transitions at each output which are differentiated by capacitors 36 and 38 respectively. The output pulses thus produced are then sent via output terminal 40 to an appropriate circuit for utilization, such as a Z-axis circuit to control the intensity of the cathode-ray tube electron beam so that brightened dots appear in the display.

As determined from the foregoing, the horizontal position of the dots is dependent upon the voltage levels on lines 29 and 30. Both potentiometers 26 and 27 are adjustable from zero to several kilohms, depending upon the voltage levels required and the available current from current source 25. For example, assume that both potentiometers 26 and 27 are adjusted for zero ohms. Thus ground potential, or zero volts, appear on both lines 29 and 30, and therefore comparators 22 and 23 switch simultaneously to produce a single intensification pulse in the zero-volt condition of the sawtooth, which in turn produces a single intensified dot at the start of the display. Potentiometer 26 may be a calibrated delay multiplier control including a readout dial which is commonly used in dual-sweep oscilloscopes. The readout dial of such a control usually includes incremental divisions from 0.00 to 10.00, corresponding to the 10 graticule divisions on the display screen. Thus when potentiometer 26 is adjusted for one-tenth of its resistance, or 1.00 on the dial, a voltage level corresponding to 0.1V is established on line 10. In this condition, two dots appear in the display, one at the left edge of the screen determined by the zerovolt level on line 29, and one at the first graticule line determined by the level on line 30. As potentiometer 26 is turned to maximum resistance, the level on the line 30 is adjusted to +V. At this point, the dial reading is 10.00 and the second dot appears at the right edge of the screen coincident with the tenth graticule line. Thus the number of graticule divisions between the first and second dots can be read directly from the delay multiplier dial.

To see the effect of the adjustment of potentiometer 27, assume that both potentiometers 26 and 27 are adjusted for zero ohms. In this case, as the resistance of potentiometer 27 is increased, a new voltage level is established on line 29 and the first dot is moved away from the left edge of the graticule scale. However, since potentiometer 26 is not affected, the first dot still corresponds to the 0.00 reading on the dial associated with potentiometer 26. For this reason, potentiometer 27 may be called a zero offset control. The value of potentiometer 27 is chosen to permit any voltage level between zero and +V to appear on line 29, thus permitting the location of the first dot anywhere horizontally on the screen. Once the desired location for the first dot is established, potentiometer 26 can be then adjusted to move the second dot to a second point of interest.

The intensification pulse for the first dot is produced by comparator 22 and capacitor 36 when the sawtooth voltage at terminal 21 rises to the level on line 29, and the intensification pulse for the second dot is produced by comparator 23 and capacitor 38 when the sawtooth rises to the level on line 30. The constant current through potentiometer 26 maintains the calibrated voltage drop there-across so that the calibrated distance between the dots can be maintained and read from the dial even through the first dot is offset from the zero position.

In the case where the first dot is offset from the start of the display, the calibrated distance between the first and second dots is maintained as follows. Assume that potentiometer 27 is adjusted to provide some voltage level between zero and +V on line 29, for example, ½V. For this example, then, the first dot appears at midscreen. As potentiometer 26 is adjusted from zero ohms, the voltage level on line 30 is adjusted from ½V toward V, and consequently, the second dot moves from mid-screen toward the right edge. When the voltage on line 30 reaches +V, the reference voltage of comparator 32 is matched, and the output of comparator 32 switches to a low state to render diode 34 conductive. Then as the resistance of potentiometer 26 is increased, the voltage thereacross continues to increase due to the constant current therethrough; however, line 30 is held at +V while line 29 is driven toward zero volts due to the operational amplifier action of comparator 32, which shunts current away via diode 34 from the zero offset potentiometer 27. As can be determined from this discussion, then the second dot remains stationary at the right edge of the screen as the delay multiplier potentiometer 26 is adjusted, and the first dot moves toward the left edge of the screen. When eventually potentiometer 26 is adjusted for maximum resistance thereof, the first dot will have reached the left edge of the screen while the second dot is held at the right edge. Thus the reading on the dial associated with delay multiplier potentiometer 26 always gives a correct reading of the calibrated distance between dots.

This circuit can be used in any application where it is desired to accurately measure distances between two points on a display, and therefore is not limited to delayed sweep applications. FIG. 3 also shows two typical risetime measurements to determine the fast-response characteristic of a laboratory oscilloscope using the indicator system of the present invention.

It will, therefore, be appreciated that the aforementioned and other desirable objects have been achieved; however, it should be noted that the particular embodiment of the invention, which is shown and described herein, is intended as merely illustrative and not as restrictive of the invention.

I claim:

1. A system for generating reference indicator signals for a display device, comprising:
   means for producing first and second reference voltage levels, said means including means for adjusting said second reference voltage level relative to said first reference voltage level;

first comparator means for comparing a substantially linear ramp voltage to a first reference voltage level and producing a first indicator signal therefrom;

second comparator means for comparing said ramp voltage to a second reference voltage level and producing a second indicator signal therefrom; and third comparator means connected between said first and second reference voltage levels for comparing said second reference voltage level to a third reference voltage level for causing said first reference voltage level to be adjustable relative to said second reference voltage level.

2. The system according to claim 1 wherein said means for producing first and second reference voltage levels comprises the series combination of a first resistor, a second resistor, and a constant current source, said first reference level being developed between said first and second resistor and said second reference level being developed between said second resistor and said current source.

3. The system according to claim 2 wherein said first and second resistors comprise first and second potentiometers, said first potentiometer for providing adjustment of said first reference level relative to a fourth reference level and said second potentiometer for providing adjustment of said second reference level relative to said first reference level.

4. The system according to claim 3 wherein said second potentiometer includes indicating means for providing a readout of the linear relationship between said first and second indicator signals according to the time for said substantially linear ramp voltage to move from said first reference level to said second reference level.

5. The system according to claim 1 wherein said substantially linear ramp voltage corresponds to a sweep-driving sawtooth waveform for providing a time base for said display device, said indicator signals occuring in linear time relationship thereof to be displayed by said display device.

6. The system according to claim 3 wherein said third reference level corresponds to the peak amplitude of said linear ramp voltage, and said third comparator means includes unidirectional conducting means to conduct when said second reference level is adjusted to said third reference level by said second potentiometer, said third comparator means and said unidirectional conducting means responding to increased voltage drops across said second potentiometer caused by further adjustment thereof by holding said second reference level constant and providing adjustment of said first reference level relative to said second reference level.

7. An improved two-dot indicator system for a display device having a time-base display, comprising:

generator means for producing first and second dots to be displayed in linear time relationship on said time-base display during the sweep time thereof;

first positioning means for positioning said first dot between the sweep start and sweep termination limits of said time-base display;

second positioning means for positioning said second dot between said first dot and said sweep termination limit; and control transfer means for detecting when said second dot is positioned to said sweep termination limit and transferring control of said second positioning means from said second dot to said first dot in response thereto.

8. The system according to claim 7 wherein said generator means includes a pair of comparators, each of said comparators having a differentiating network in the output thereof; said first and second positioning means comprise a serially-connected pair of potentiometers connected between a constant-current source and a reference voltage, said potentiometers setting the comparison levels for said comparators; and said control transfer means includes a third comparator having one input and the output thereof connected across said second positioning means.

9. The system according to claim 7 wherein said second positioning means includes readout means to provide a readout of the linear time difference between said first and second dots.

10. The system according to claim 7 wherein said control transfer means also detects when said first dot is positioned by said second positioning means to the position set by said first positioning means and transfers control of said second positioning means from said first dot to said second dot in response thereto.

11. The system according to claim 8 wherein said generator means operates in response to a linear sawtooth voltage waveform wherein the amplitude of said sawtooth waveform corresponds to one screen width of said didplay device, said dots being generated by said generating means when said sawtooth waveform rises to said comparison levels to thereby establish a linear time difference between said dots, and said second positioning means includes readout means calibrated to said sawtooth waveform to provide accurate readout of the time difference between said first and second dots.

* * * * *